April 22, 1941.  H. T. LAMBERT  2,239,236
BRAKE MECHANISM
Filed March 2, 1940   3 Sheets-Sheet 2

Inventor
H. T. Lambert
By Robb & Robb
Attorneys

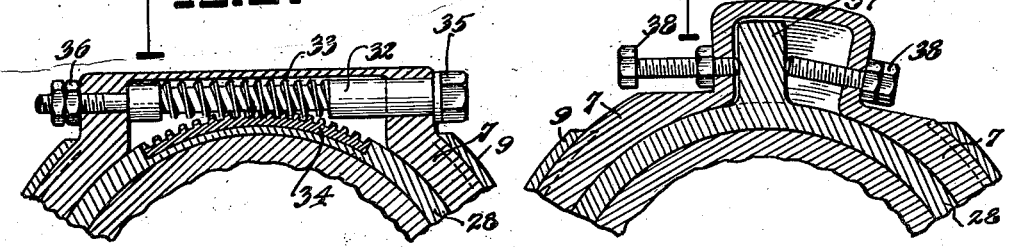
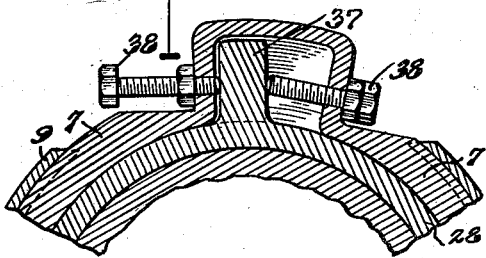
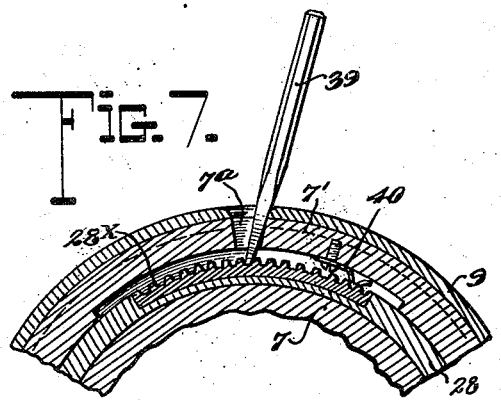
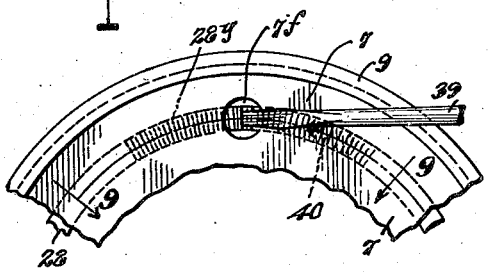
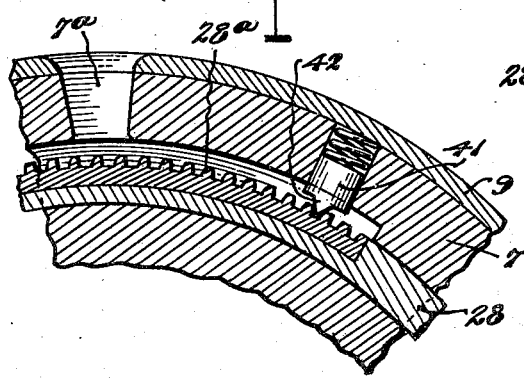
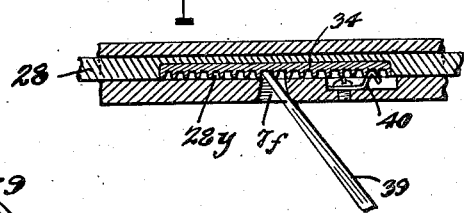

Patented Apr. 22, 1941

2,239,236

UNITED STATES PATENT OFFICE 2,239,236

BRAKE MECHANISM

Homer T. Lambert, St. Joseph, Mich.

Application March 2, 1940, Serial No. 322,028

13 Claims. (Cl. 188—72)

The present invention relates to improvements in brake mechanisms, particularly of the disc type, and it has for its primary object the provision of novel means for readily and quickly adjusting the brake instrumentalities to take up wear and tear of the parts thereof.

It is further an object of this invention to provide a brake construction in the form of a compact assembly unit in which the braking elements embody self-energizing means automatically operative to produce axial braking pressure upon the application of torque to said braking elements initiated by the primary actuating means, combined with means for uniformly adjusting said energizing means.

More specifically, these improvements include a plurality of pairs of disc inserts with interposed energizing rollers arranged at spaced intervals and annularly disposed adjusting means for simultaneously adjusting the co-acting inserts without disassembling any part of the brake assembly unit.

Other and further objects and advantages of the invention will be hereinafter set forth and the novel features thereof defined by the appended claims.

In the accompanying drawings:

Figure 4 is an enlarged fragmentary sectional view taken about on the plane indicated by the line 4—4 of Figure 2, showing the preferred type of adjusting means for the adjustable camming discs;

Figure 5 is a fragmentary sectional view showing a modification of the adjusting means for the camming ring, embodying a worm and gear construction;

Figure 6 is a view similar to Figure 5, but disclosing a different type of adjusting means for the camming ring;

Figure 7 shows in section a still further modification of camming ring adjusting means and the method of utilizing an instrument to engage the teeth of the periphery of the ring through an opening in the brake housing and one type of locking detent for holding the ring at adjusted position;

Figure 8 shows an adjusting means similar to that of Figure 7 in which the camming ring is formed with teeth on its face rather than the edge as disclosed in Figure 7;

Figure 9 is a sectional view on the line 9—9 of Figure 8; and

Figure 10 is a detail sectional view showing a modified form of locking detent for the camming ring.

Like reference characters designate corresponding parts in the several figures of the drawings.

Figure 1:
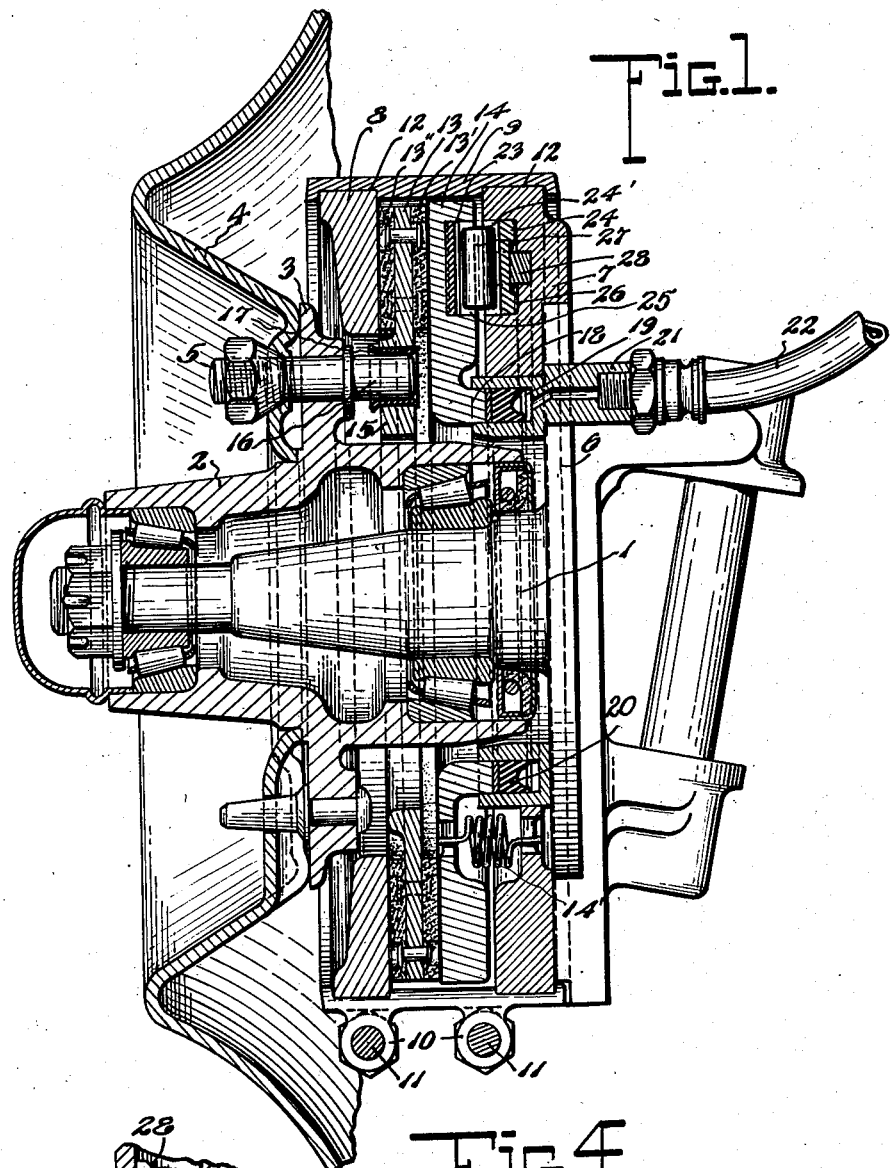
Figure 1 is a vertical sectional view through a brake unit and supporting means embodying the invention.

Referring first to Figure 1 of the drawings, 1 designates a front spindle support of an automobile vehicle, 2 the wheel hub having a flange 3 to which the wheel 4 is detachably secured, as by means of the stud bolts 5.

The brake assembly unit of these improvements is mounted between the hub flange 3 and the spindle flange 6, and comprises a backing plate or disc 7 fixedly secured to the flange 6, and a relatively stationary brake disc 8 arranged in spaced relation, one of these parts being located at the inner end and the other at the outer end of an open-ended brake housing or drum 9.

Figure 2:
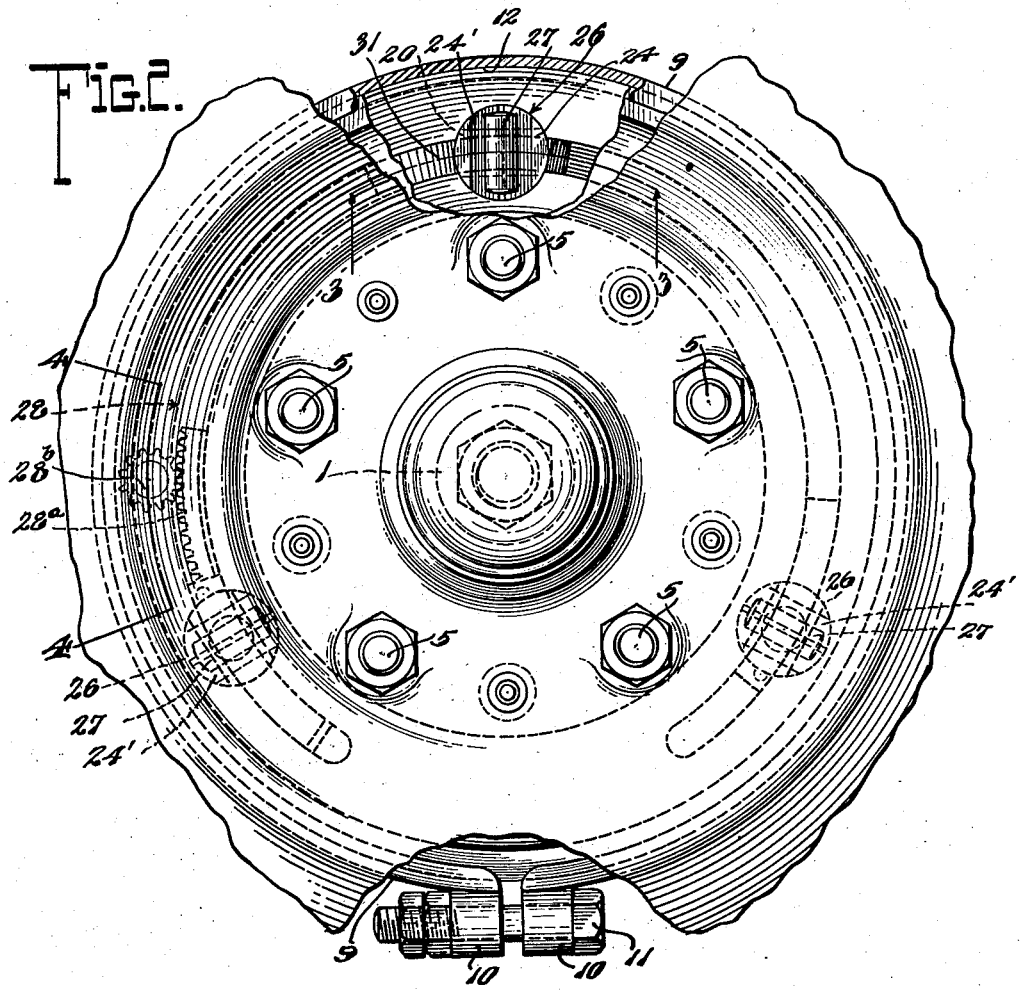
Figure 2 is a view in elevation partially broken away and in section to show more clearly certain details of the construction.

As will be observed in Figure 2, this housing is in the form of a heavy split band of preferably spring metal having a double set of apertured clamping lugs 10, 10 in which are received the clamping bolts 11, by means of which the housing is clamped about the two discs 7 and 8, said discs seating snugly in internal grooves 12, 12 formed in the band.

Within this housing construction is arranged the rotary braking ring 13 between the stationary disc 8 and a free floating pressure plate 14. This ring is provided with opposed friction faces 13', 13'', and formed with a series of driving lugs 15 mounted upon the extension ends 16 of the stud bolts 5 and the interposed resilient bushings 17.

The pressure plate 14 is formed with a flange 18 extending into the annular groove 19 in which is also mounted the flexible channeled ring 20. This construction adapts the brake device for hydraulic operation, the pressure medium being admitted into the groove 19 through the nipple 21 to which the pipe 22 is connected.

Figure 3:
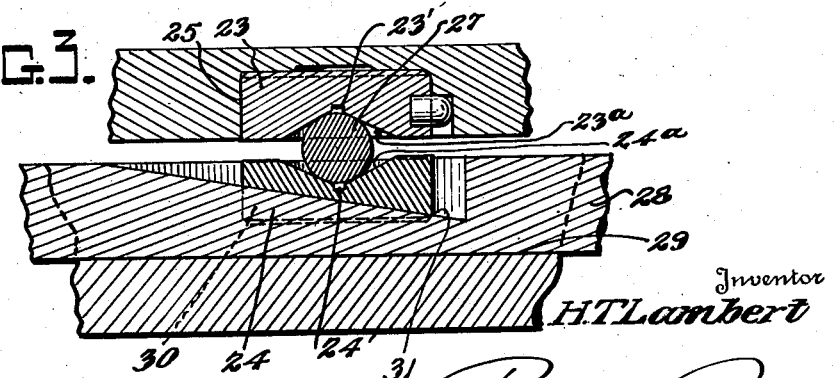
Figure 3 is an enlarged fragmentary sectional view taken about on the plane indicated by the line 3—3 of Figure 2.

In this construction of brake, servo or self-energizing means are employed in the form of hardened inserts 23, 24. A series of those designated 23 is fixedly secured in recesses 25 in the pressure plate 14, while the corresponding opposing series 24 is similarly mounted in recesses 26 in the backing plate 7. A camming roller 27 is freely mounted in the grooves 23', 24' (see Figure 3) of the inserts so as to coact with the inclined camming faces 23a, 24a. It may be noted that the inserts 24 are rotatably mounted in their seats, and are especially constructed to cooperate with the primary feature of the present invention now to be more particularly set forth.

In the course of time, the braking instrumentalities, as well as the hardened inserts 23, 24, are subject to wear upon their friction surfaces due to the relative movements of these parts under the heavy pressures of brake operations. From time to time, therefore, it becomes necessary to make adjustment to take up and adjust not only the brake members or discs themselves, but also the energizing means hereinbefore described. To facilitate this operation of adjustment by simple means is the objective of these improvements. To this end, I mount an annulus or camming ring 28 in an annular groove 29 in the face of the backing plate 7. As will be noted in Figures 2 and 3, the ring 28 engages in a transverse camming groove 30 in the back of each disc 24, said groove being sufficiently larger than the width dimension of the ring 28 to permit the discs to rotate slightly in the functioning of these parts during servo brake operation. The base of each groove 30 is inclined to correspond to the base of a coacting recess 31 formed in the ring 28, as most clearly shown in Figure 3 of the drawings. Under normal conditions, the parts of the brake mechanism may perform their functions without interference by the adjusting ring 28, but when it is necessary to take up wear between the functioning parts of the brake construction, this may readily be accomplished by rotating the camming ring 28 in its seat by the actuating means disclosed so far as the preferred form is concerned in Figure 4 of the drawings. It will be noted that the ring 28 is provided on its periphery with a segment at least formed with transverse teeth 28a with which the pinion 28b engages, said pinion being mounted upon the short shaft 28c projecting through the backing plate 7 and having a squared extremity 28d to receive a wrench or tool for rotating the shaft. Preferably the shaft is locked when adjustment is obtained by the locking nuts 28e. As the ring is shifted in the manner described, the inclined camming faces of said ring and insert recesses will shift relative to each other and the inserts 24 as a group will be adjusted axially, and, in turn, this axial movement will be imparted to the cooperating inserts as well as the braking parts 14 and 13. In this manner wear may be taken up and the clearance between the braking discs adjusted without in anywise disturbing the brake mechanisms other than incident to the axial shifting of the parts in the manner above referred to.

A brief statement of the operation of the brake construction may be noted at this point. Upon brake application, the pressure medium passing through the pipe 22 into the cylinder or groove 19 acts upon the flange or piston 18 to shift the disc 14 into contact with the rotary ring 13. Rotation is picked up by the pressure plate or disc 14 which sets into operation the servo mechanism, causing the rollers to ride up the inclined faces of the disc inserts to produce axial pressure against the rotary member 13 which, in turn, frictionally engages with the stationary brake disc 8 to produce braking effect, the braking stresses being transferred to the housing 9 and in turn to the spindle support 6, thereby preventing undue strain upon the braking parts and eliminating dishing or warpage of the braking discs.

Upon release of the pressure of brake application, the pressure plate 14 is shifted laterally by the spring elements 14' disposed between the pressure plate and the backing plate. These springs not only draw the plate away from the rotary brake ring 13, but they also rotate the pressure plate back to normal position with the rollers 27 disposed in the base of the grooves of the energizing inserts 23, 24.

The adjusting means for the camming ring 28 may readily be modified in respect to the construction shown in Figure 4, and such modifications are illustrated in detail in Figures 5 to 6.

In the form of adjusting means shown in Figure 5, a tangentially arranged shaft 32 is provided with a worm 33 engaging the segmental gear 34 on the camming ring. The shaft is rotated by applying a wrench to the head 35 and locked in adjusted position by the nuts 36.

In Figure 6 the camming ring 28 is formed with a lateral lug 37 with which the adjusting screws 38 coact for adjusting and locking the ring in the desired position.

In Figure 7 the brake housing 7' is provided with an opening 7a through which a tool 39 may be introduced into engagement with the ring teeth 28x to shift the ring. A spring detent 40 is secured within the housing to engage and hold the ring at adjusted position.

The construction shown in Figure 8 differs from that of Figure 7 only in that the teeth 28y are formed on the lateral face of the ring and the housing opening 7f is accordingly located for convenient access to these teeth.

In Figure 10, I have shown a slightly different type of locking detent in the form of a spring actuated plunger 41 having a projection 42 engageable with the teeth to hold the ring at adjusted position.

While the specific details of construction have been herein shown and described, the invention is not confined thereto as alterations may be made without departing from the spirit thereof as defined by the appended claims.

Having thus described my invention, what I claim as new and desire to secure by Letters Patent is:

1. Brake mechanism for vehicles comprising in combination, a support, brake applying members mounted thereon, a plurality of separate and independently mounted means arranged on and about said brake applying members and in spaced relation to each other for shifting said members axially to produce brake application, and means for simultaneously adjusting said axial shifting means to take up wear and maintain the proper clearance between the brake members.

2. Brake mechanism for vehicles comprising in combination, a support, brake applying members mounted thereon, means arranged about the brake applying members for shifting said members axially to produce brake application, and annular means contacting with said shifting means for adjusting all said axial shifting means simultaneously to take up wear and maintain the proper clearance between the brake members, said last-named means comprising a camming ring and means for rotating the same.

3. Brake mechanism for vehicles comprising in combination, a support, brake discs arranged thereon, primary actuating means for shifting said discs to produce brake application, a plurality of separate and independently mounted auxiliary torque actuated means to produce additional brake pressure, and adjusting means coacting with and common to all said torque actuated means to take up wear and maintain clearance between the braking elements.

4. Brake mechanism for vehicles comprising in combination, a support, brake discs arranged thereon, primary actuating means for shifting said discs to produce brake application, a plurality of auxiliary torque actuated means to produce additional brake pressure, and adjusting means coacting with and common to all said torque actuated means to take up wear and maintain clearance between the braking elements, said torque actuated means comprises camming inserts for shifting the brake discs axially, and the adjusting means comprises an annular member overlying said inserts and includes additional cams for effecting said shifting action.

5. Brake mechanism for vehicles comprising in combination, a support, brake discs arranged thereon, primary actuating means for shifting said discs to produce brake application, auxiliary torque actuated means to produce additional brake pressure, and adjusting means coacting with said torque actuated means to take up wear and maintain clearance between the braking elements, said torque actuated means comprising camming disc inserts and rollers mounted intermediate the brake discs and the support, and the adjusting means comprises a ring operable to cam the inserts to thereby adjust the brake discs.

6. Brake mechanism of the class described comprising in combination, a housing, stationary brake and backing discs in said housing, a part to be braked between said discs, a pressure plate cooperative with said part, means for actuating said pressure plate to cause frictional contact with the part to be braked, energizing means between the pressure plate and the backing plate operable upon the application of torque to the pressure plate by the part to be braked, a rotatable camming ring mounted in said backing plate and coacting with the energizing means, and means for rotating said camming ring to adjust the energizing means and braking parts.

7. Brake mechanism of the class described comprising a housing, braking elements mounted therein including a pressure plate shiftable axially of said housing, means for actuating said plate to produce brake application, self-energizing means intermediate said plate and the housing for producing axial pressure upon said pressure plate comprising sets of disc inserts arranged about the axis of said brake, an adjusting ring coacting with said inserts to shift the same axially and having a toothed segment for actuating said ring, and detent means engageable with said ring for holding it in adjusted position.

8. Brake mechanism of the class described comprising a housing, braking elements mounted therein including a pressure plate shiftable axially of said housing, means for actuating said plate to produce brake application, self-energizing means intermediate said plate and the housing for producing axial pressure upon said pressure plate comprising sets of disc inserts arranged about the axis of said brake, an adjusting ring coacting with said inserts to shift the same axially and having a toothed segment for actuating said ring, and means engageable with the toothed segment for rotating the ring to effect adjustment of the inserts and said plate.

9. Brake mechanism of the class described comprising a housing, braking elements mounted therein including a pressure plate shiftable axially of said housing, means for actuating said plate to produce brake application, self-energizing means intermediate said plate and the housing for producing axial pressure upon said pressure plate comprising sets of disc inserts arranged about the axis of the brake, an adjusting ring coacting with said inserts to shift the same axially and having a toothed segment for actuating said ring, said ring having recesses interengaging with certain of the disc inserts, the surfaces of said recesses being inclined to provide cam faces for actuating the disc inserts.

10. Brake mechanism as set forth in claim 7, wherein the adjusting ring is actuated by a worm shaft to effect rotation of said ring and shifting of the inserts in an axial direction.

11. Brake mechanism of the class described comprising a housing, braking elements mounted therein including a pressure plate shiftable axially of said housing, means for actuating said plate to produce brake application, self-energizing means intermediate said plate and the housing for producing axial pressure upon said pressure plate comprising sets of disc inserts arranged about the axis of said brake, an adjusting ring coacting with said inserts for shifting the same axially and having a lateral projection, and means coacting with said projection to effect adjustment of the ring and lock it at adjusted positions.

12. Brake mechanism of the class described comprising a housing, braking elements mounted therein including a pressure plate shiftable axially of said housing, means for actuating said plate to produce brake application, self-energizing means intermediate said plate and the housing for producing axial pressure upon said pressure plate comprising sets of disc inserts arranged about the axis of said brake, an adjusting ring coacting with said inserts to shift the same axially and having a toothed segment for actuating said ring, detent means engageable with said ring for holding it in adjusted position, the housing having an opening adjacent the toothed segment through which a tool may engage said segment for shifting the ring as aforesaid.

13. Brake mechanism of the class described, comprising a housing, braking elements mounted therein including a pressure plate shiftable axially of said housing, means for actuating said plate to produce brake application, self-energizing means intermediate said plate and the housing for producing axial pressure upon said pressure plate comprising sets of disc inserts arranged about the axis of said brake, certain of the disc inserts having camming recesses in one face thereof, an adjusting ring provided with cams for coacting with the camming surfaces of the inserts aforesaid, and detent means in the brake housing and engageable with the peripheral portion of the adjusting ring for holding said ring at adjusted positions.

HOMER T. LAMBERT.